(12) United States Patent
Gauker (10) Patent No.: US 11,819,017 B2
(45) Date of Patent: Nov. 21, 2023

(54) DOOR HINGE MECHANISM FOR ANIMAL CAGE TRAP AND METHOD OF MOUNTING A CAGE TRAP DOOR TO A WIRE MESH CAGE TRAP USING THE SAME

(71) Applicant: Woodstream Corporation, Lancaster, PA (US)

(72) Inventor: Andrew Gauker, Mohnton, PA (US)

(73) Assignee: Woodstream Corporation, Lancaster, PA (US)

( * ) Notice: Subject to any disclaimer, the term of this patent is extended or adjusted under 35 U.S.C. 154(b) by 523 days.

(21) Appl. No.: 16/862,234

(22) Filed: Apr. 29, 2020

(65) Prior Publication Data
US 2020/0344995 A1 Nov. 5, 2020

Related U.S. Application Data

(60) Provisional application No. 62/840,768, filed on Apr. 30, 2019.

(51) Int. Cl.
*A01M 23/18* (2006.01)

(52) U.S. Cl.
CPC .................. *A01M 23/18* (2013.01)

(58) Field of Classification Search
CPC ...... A01M 23/16; A01M 23/18; A01M 23/20; A01M 23/08
USPC ..................... 43/60, 61, 64, 65, 67
See application file for complete search history.

(56) References Cited

U.S. PATENT DOCUMENTS

| | | | | |
|---|---|---|---|---|
| 608,705 A * | 8/1898 | Neal | ...................... | A01M 23/18 43/61 |
| 1,474,087 A * | 11/1923 | Prime | ................... | A01M 23/18 43/66 |
| 2,243,367 A * | 5/1941 | Abriol | ................... | A01M 23/18 43/61 |
| 2,725,661 A * | 12/1955 | Bowman | ............... | A01M 23/18 43/61 |
| 3,394,487 A * | 7/1968 | Wood | ..................... | A01M 23/18 43/61 |
| 3,483,652 A * | 12/1969 | Hanlan | ................. | A01M 23/20 43/61 |

(Continued)

FOREIGN PATENT DOCUMENTS

| | | | |
|---|---|---|---|
| DE | 536590 C | * 10/1931 | |
| GB | 2433016 A | * 6/2007 | ............ A01M 23/18 |

(Continued)

*Primary Examiner* — Darren W Ark
(74) *Attorney, Agent, or Firm* — Barley Snyder (57) ABSTRACT

A door hinge mechanism for a live catch wire mesh animal cage trap and a method of mounting a cage trap door to a wire mesh animal cage trap using the door hinge mechanism is provided. The hinge mechanism includes a door mounting portion and a roof mounting portion joined by a body portion. The door mounting portion captures a laterally extending upper edge bar of the door and positions the door relative to a laterally extending wire bar on the roof to couple the door to the trap body and create a hinge axle therebetween. The roof mounting portion, which is spaced rearwardly from the door mounting portion by the body portion, secures the hinge mechanism to the roof of the trap body. When so mounted, the hinge mechanism provides greater trap stiffness at the hinge, improved rigidity of the hinge mechanism and trap door, and reduced friction in the hinge pivot.

16 Claims, 10 Drawing Sheets

(56) References Cited

U.S. PATENT DOCUMENTS

| | | | | |
|---|---|---|---|---|
| 3,624,951 | A * | 12/1971 | Gilbaugh | A01M 23/18 160/4 |
| 3,823,504 | A * | 7/1974 | Dosch | A01M 23/18 43/61 |
| 4,590,704 | A * | 5/1986 | Volk | A01M 23/18 43/60 |
| 4,873,785 | A * | 10/1989 | Lai | A01M 23/30 43/61 |
| 5,329,723 | A * | 7/1994 | Liul | A01M 23/18 43/61 |
| 5,386,663 | A * | 2/1995 | Fields | A01M 23/18 43/66 |
| 6,658,788 | B1 * | 12/2003 | Steinfest | A01M 23/20 43/61 |
| 7,757,427 | B2 * | 7/2010 | Bucher | A01M 23/18 43/61 |
| 7,958,668 | B2 * | 6/2011 | Walter | A01M 23/16 43/60 |
| 8,046,953 | B2 * | 11/2011 | Radesky | A01M 23/18 43/61 |
| 8,407,931 | B1 * | 4/2013 | Humphrey | A01M 23/18 43/67 |
| 2003/0019148 | A1 * | 1/2003 | Kao | A01M 23/18 43/61 |
| 2008/0115405 | A1 * | 5/2008 | Bucher | A01M 23/18 43/61 |
| 2009/0094882 | A1 * | 4/2009 | Comstock | A01M 23/18 43/61 |
| 2009/0307961 | A1 * | 12/2009 | Walter | A01M 23/16 43/60 |
| 2011/0179693 | A1 * | 7/2011 | Chiu | A01M 23/18 43/61 |
| 2014/0298710 | A1 * | 10/2014 | Pomerantz | A01M 23/18 43/61 |
| 2015/0245603 | A1 * | 9/2015 | Marks | H05K 999/99 43/61 |
| 2016/0198697 | A1 * | 7/2016 | Zhu | A01M 23/18 43/62 |
| 2017/0231214 | A1 * | 8/2017 | Vaisblat | A01M 31/002 43/60 |
| 2017/0367318 | A1 * | 12/2017 | Marks | H05K 999/99 |
| 2019/0320643 | A1 * | 10/2019 | Marks | H05K 999/99 |
| 2022/0046909 | A1 * | 2/2022 | Kletzli | A01M 23/18 |
| 2022/0142144 | A1 * | 5/2022 | Patterson | A01K 29/005 |

FOREIGN PATENT DOCUMENTS

| | | | |
|---|---|---|---|
| JP | 3164897 | U * | 12/2010 |
| JP | 3188488 | U * | 1/2014 |
| JP | 2016093139 | A * | 5/2016 |
| JP | 5945663 | B1 * | 7/2016 |
| JP | 3226141 | U * | 4/2020 |
| WO | WO-8605657 | A1 * | 10/1986 |

* cited by examiner

DOOR HINGE MECHANISM FOR ANIMAL CAGE TRAP AND METHOD OF MOUNTING A CAGE TRAP DOOR TO A WIRE MESH CAGE TRAP USING THE SAME

CROSS-REFERENCE TO RELATED APPLICATION

This application claims priority under 35 U.S.C. § 119 to U.S. Provisional Patent Application No. 62/840,768, filed Apr. 30, 2019.

FIELD OF THE INVENTION

This invention relates to cage-type animal traps of the kind generally used outdoors for trapping small to medium sized animals using bait placed inside the trap.

BACKGROUND

Wire mesh cage traps have been used for decades as a means of trapping problem animals so that they can be relocated and released at another location. Such traps commonly comprise a cage of metal wire mesh or the like with an entry door at a forward end of the trap and a closed rearward end. The entry door is held open by a trigger mechanism until an animal is lured into the trap by suitable bait which is placed between the rearward end of the trap and the trigger mechanism as part of the trap setting procedure. After the animal enters the interior of the trap to reach the bait, the animal's weight pressed against the trigger actuates a trip which releases and closes the entry door, thereby trapping the animal inside the cage. Traps of this type include the Havahart® Model 1079 and the Havahart® EASY SET® live animal cage traps, both of which are manufactured and sold by Woodstream Corporation of Lititz, Pa., which is the assignee of the instant invention. The Havahart® EASY SET® live animal cage trap is described and illustrated in U.S. Pat. No. 7,757,427 ("the '427 patent"), the disclosure of which is hereby incorporated by reference as if fully set forth herein in its entirety.

The entry door on cage traps like the Havahart® Model 1079 and Havahart® EASY SET® live animal cage traps is hingedly connected to the body of the trap. Traditional door attachment methodology included the use of wire clinching clips that are placed around a wire bar of the trap body and an adjacent wire bar on the edge of the door. While these clips work effectively with smaller diameter wire, they limit the maximum size of the wire gauge combinations that can be clipped together to form a correctly functioning hinge mechanism.

Therefore, a need exists for an improved entry door hinge that can accommodate larger wire gauge combinations while creating an effective hinge mechanism.

SUMMARY

In view of the foregoing, the present invention is directed to a cage-type animal trap that includes a wire mesh animal enclosure defined by a trap body made up of a base, a pair of opposed sidewalls emanating from the base, a rear wall secured to the sidewalls and the base, a roof secured to the tops of the sidewalls and the rear wall, and a front end defined by the base, sidewalls, and roof which is provided with an animal access opening. An entry door is movably mounted at the front end and operates in an opened position to reveal the animal access opening and in a closed position to block the animal access opening. The trap body and the door are made of a plurality of spaced wire bars as is known in the art.

As used herein, the terms "front" and "forward" refer to that end of the trap having the entry door while "rear" and "rearward" refer to the end of the trap opposite the front end. The term "longitudinal" refers to that direction corresponding with the length of the trap from the front end to the rear end thereof, while the term "lateral" refers to a direction substantially perpendicular to the "longitudinal" direction. As used in connection with direction or the relationship between two directions, the term "substantially" is defined as being nearly that of the stated value or parameter as would be understood upon visual observation by the person of ordinary skill in the art but not requiring mathematical precision with respect to the stated value or parameter.

The trap also has a setting mechanism that is coupled to a trip mechanism for initiating activation of trap closure. When tripped, a torsion spring or other mechanism urges the entry door toward its closed position. Once closed, a locking yoke is typically provided that prevents an animal caught within the trap from forcing the entry door open from inside the trap.

According to the present invention, the entry door is mounted at the front end of the trap using a hinge mechanism that has a door mounting portion, a roof mounting portion and a substantially planar body portion that joins the door mounting portion and the roof mounting portion. The body portion, which is preferably formed integrally with the mounting portions, such as by formed sheet metal, is substantially parallel with the roof of the trap when the hinge mechanism is mounted thereon.

The door mounting portion includes a front edge having a J-hook configuration with longitudinally extending slots at spaced intervals that correspond with the spacing of the longitudinally extending wire bars on the trap body such that the longitudinally extending wire bars are accommodated within the slots when the hinge mechanism is mounted. The J-hook shape, which is evident when the front edge is viewed laterally, i.e., from the side of the trap, is configured to receive the laterally extending wire bar at the upper edge of the door and to work cooperatively with a laterally extending wire bar on the roof of the trap. In properly positioning the upper edge bar of the door relative to the roof bar, the J-hook also provides clearance to allow rotational movement of the upper edge door bar relative to the roof bar as the door moves between the open and closed positions. By adjusting the size of the J-hook, virtually any wire gauge combination of the door and the trap body can be clipped together to create an effective hinge mechanism.

With respect to the trap entry door, it is understood that the longitudinally extending wire bars on the door are substantially parallel with the longitudinally extending wire bars on the trap body when the door is in the open position. However, this substantially parallel relationship does not apply when the door is in the closed position due to the door being angled downwardly from its hinged connection with the trap to a bottom edge of the door to close the animal access opening. However, for ease of description, the wire bars on the door that are substantially parallel with the longitudinally extending wire bars on the trap body when the door is open are referred to as the longitudinally extending door wire bars.

The roof mounting portion of the hinge mechanism includes a plurality of spaced attachment tabs formed at the rear edge of the body portion. Prior to being mounted on the trap, the attachment tabs extend substantially perpendicular to the body portion, creating an elbow joint, and are separated from one another by slots. Like the slots in the door mounting portion, the slots in the roof mounting portion are also positioned at spaced intervals that correspond with the spacing of the longitudinally extending wire bars on the trap body. Thus, the longitudinally extending wire bars on the roof of the trap body are accommodated within the slots when the hinge mechanism is positioned on the roof for mounting, while the attachment tabs extend downwardly toward the base of the trap body. The elbow joint between the body portion and the tabs is placed closely rearward of and generally parallel with a laterally extending wire bar of the roof. To complete the mounting of the hinge mechanism, the attachment tabs are curled around the adjacent laterally extending wire bar, effectively bending them forwardly along the elbow joint to lap under the body portion, thus securing the hinge mechanism to the trap body.

Once secured to the trap in this way, the hinge mechanism creates a more precise axial location of the hinge pivot at the door mounting portion for improved hinge action and more repeatable setting and tripping action as compared with conventional wire clinching clips. The hinge mechanism also provides greater trap stiffness at the hinge, improved rigidity of the hinge mechanism and trap door, and reduced friction in the hinge pivot.

Accordingly, it is an object of the present invention to provide a wire mesh animal cage trap with a hinge mechanism having a door mounting portion, a roof mounting portion and a substantially planar body portion that joins the door mounting portion and the roof mounting portion, the door mounting portion hingedly securing the trap entry door to the trap body and the roof mounting portion securing the hinge mechanism to the roof of the trap.

Another object of the present invention is to provide a wire mesh animal cage trap with a hinge mechanism in accordance with the preceding object in which the door mounting portion includes a front edge having a J-hook configuration with longitudinally extending slots at spaced intervals that correspond with the spacing of the longitudinally extending wire bars on the trap body such that the longitudinally extending wire bars are accommodated within the slots when the hinge mechanism is mounted.

Still another object of the present invention is to provide a wire mesh animal cage trap with a hinge mechanism in accordance with the preceding object in which the J-hook shape of the door mounting portion is configured to receive the laterally extending wire bar at the upper edge of the door and to cooperate with a laterally extending wire bar on the roof of the trap while providing clearance to allow unhindered rotational movement of the upper edge door bar relative to the roof bar as the door moves between the open and closed positions, the size of the J-hook being selected to enable virtually any wire gauge combination of the door and the trap body to operate smoothly together.

Yet another object of the present invention is to provide an animal cage trap with a hinge mechanism in accordance with at least one of the preceding two objects in which the roof mounting portion includes a plurality of spaced attachment tabs formed at the rear edge of the body portion, the attachment tabs being bendable to secure the body portion flatly on top of the roof of the trap when the hinge mechanism is mounted thereon. A further object of the present invention is to provide an animal cage trap with a hinge mechanism in accordance with the preceding object in which, prior to being mounted on the trap, the attachment tabs extend downwardly toward the base of the trap body and substantially perpendicular thereto, and are separated from one another by slots positioned at spaced intervals that correspond with the spacing of the longitudinally extending wire bars on the trap body so that the longitudinally extending wire bars on the roof of the trap body are accommodated within the slots when the hinge mechanism is positioned on the roof for mounting.

Yet a further object of the present invention is to provide an animal cage trap with a hinge mechanism in accordance with the preceding object in which the hinge mechanism is secured to the trap body by placing the elbow joint that joins the body portion and the tabs closely behind and generally parallel with a laterally extending wire bar of the roof and then curling the attachment tabs forwardly around the adjacent laterally extending wire bar to lap the tabs under the body portion.

Still another object of the present invention is to provide a wire mesh animal cage trap with a hinge mechanism having a door mounting portion and a roof mounting portion, the hinge mechanism creating a more precise axial location of the hinge pivot at the door mounting portion for improved hinge action and more repeatable setting and tripping action as compared with conventional wire clinching clips.

Yet another object of the present invention is to provide an animal cage trap with a hinge mechanism having a body portion that is mounted flat on top of the roof of the trap and a door mounting portion that hingedly secures the entry door to the trap body, the hinge mechanism providing greater trap stiffness at the hinge, improved rigidity of the hinge mechanism and trap door, and reduced friction in the hinge pivot.

Another object of the present invention is to provide an animal cage trap made of mesh with a hinge mechanism that includes a formed sheet-metal component, integrated features of the formed sheet-metal component including a hinge portion for mounting the entry door of the trap to the trap body, and a body portion that attaches the component to the cage mesh.

Yet another object of the present invention is to provide a mesh animal cage trap with a hinge mechanism in accordance with the preceding object in which the hinge portion includes a J-hook configuration configured to position a laterally extending wire bar at the upper edge of the door adjacent and in proper spaced relationship with a laterally extending wire bar on the roof of the trap while providing sufficient space within the J-hook to allow unhindered rotational movement of the upper edge door bar relative to the roof bar as the door moves between the open and closed positions.

Still another object of the present invention is to provide a wire mesh animal cage trap with a hinge mechanism in accordance with the preceding object in which the J-hook configuration includes longitudinally extending slots at spaced intervals that correspond with the spacing of the longitudinally extending wire bars on the trap body such that the longitudinally extending wire bars are accommodated within the slots when the hinge mechanism is mounted.

A further object of the present invention is to provide a wire mesh animal cage trap with a hinge mechanism in accordance with at least one of the preceding three objects in which the body portion that attaches the formed sheet-metal component to the cage mesh includes a plurality of spaced attachment tabs formed at the rear edge of the hinge mechanism, the attachment tabs being bendable to secure the mechanism to the roof of the trap when mounted thereon.

Yet a further object of the present invention is to provide an animal cage trap with a hinge mechanism in accordance with the preceding object in which, prior to being mounted on the trap, the attachment tabs extend downwardly toward the base of the trap body and substantially perpendicular thereto, and are separated from one another by slots positioned at spaced intervals that correspond with the spacing of the longitudinally extending wire bars on the trap body so that the longitudinally extending wire bars on the roof of the trap body are accommodated within the slots when the hinge mechanism is positioned on the roof for mounting.

Still a further object of the present invention is to provide an improvement in a live catch animal trap that has an animal enclosure with a trap body and an animal access opening into a vacant interior sized to receive an animal to be trapped, with an entry door being movably mounted at the access opening, the entry door operative in an opened position to reveal the animal access opening and in a closed position to block the animal access opening, the improvement including a hinge mechanism that couples the entry door to a roof of the trap body, the hinge mechanism including a door mounting portion that captures a laterally extending upper edge bar of the door and positions the upper edge bar adjacent and in proper spaced relationship with a laterally extending wire bar on the roof to couple the door to the trap body while allowing pivotal movement on the hinge axle created by the roof bar, the upper edge door bar and the door mounting portion, and a roof mounting portion spaced rearwardly from the door mounting portion by a body portion, the roof mounting portion securing the hinge mechanism to the roof of the trap body.

Another object of the present invention is to provide a method of mounting an entry door hinge mechanism to a wire mesh animal cage trap, the hinge mechanism including a front end with a J-hook for hingedly securing the entry door to the trap and a body with attachment tabs at a rear end for securing the hinge mechanism to the trap body, the method including positioning the J-hook to place a laterally extending wire bar at the upper edge of the door within the J-hook, lifting the J-hook to position the upper edge door bar adjacent a laterally extending wire bar on the roof of the trap, lowering the body to be generally parallel with and on top of the roof of the trap with the attachment tabs extending downwardly toward the base of the trap and generally perpendicular thereto, and bending the attachment tabs forwardly to lap them under the body while capturing a laterally extending wire bar of the roof, thereby securing the hinge mechanism against the roof.

Still another object of the present invention is to provide a method of mounting an entry door hinge mechanism to an animal cage trap in accordance with the preceding object in which the hinge mechanism when so mounted provides greater trap stiffness at the hinge, improved rigidity of the hinge mechanism and trap door, and reduced friction in the hinge pivot.

Still another object of the present invention is to provide an animal cage trap having a hinge mechanism that is economical to manufacture, easy to use, and reliable and durable in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

It is to be understood that the embodiments described herein are disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1:
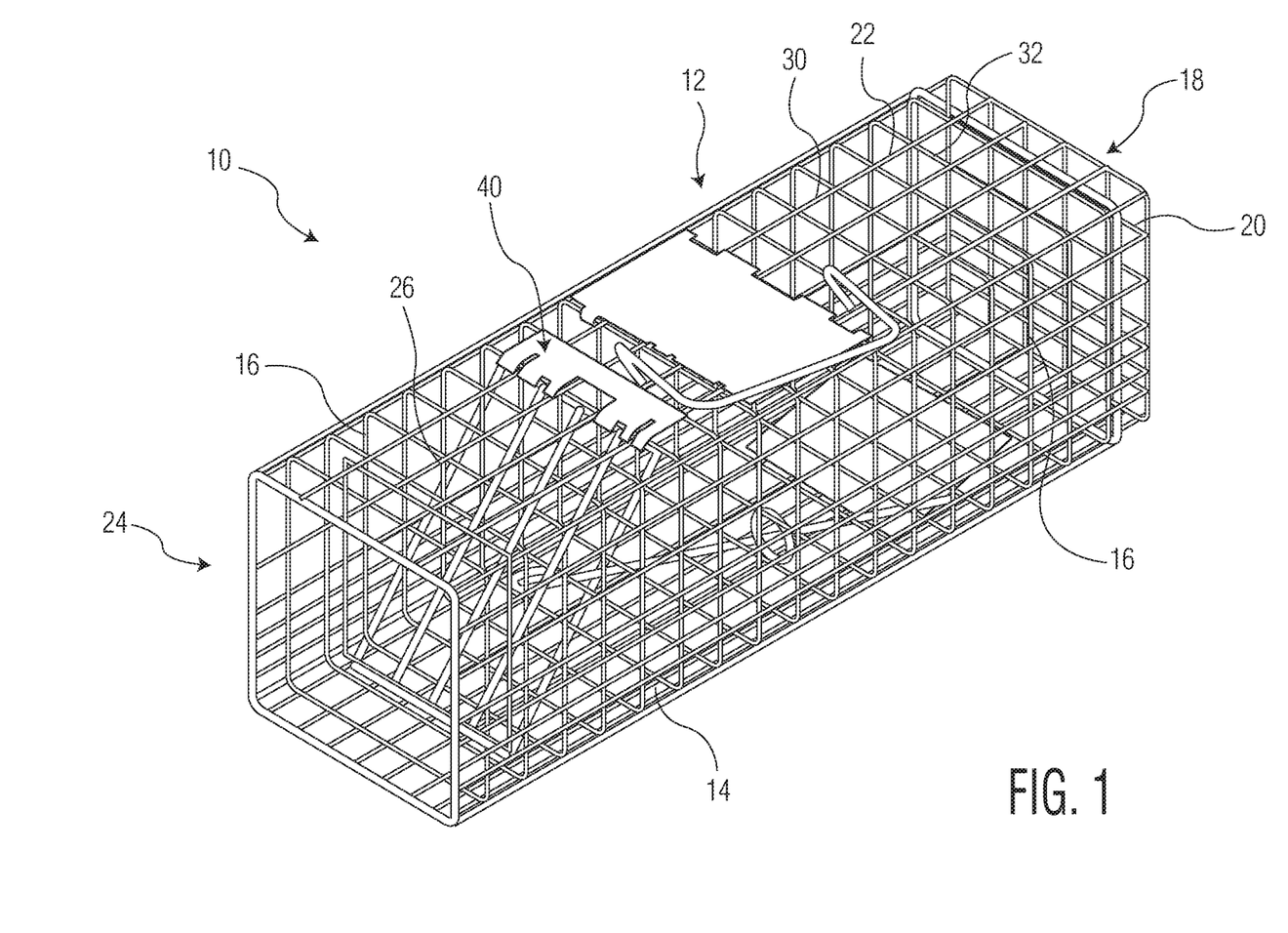
FIG. 1 is a perspective view of an animal cage trap with a hinge mechanism in accordance with the present invention.

An animal cage trap having a hinge mechanism according to the present invention is shown in FIG. 1 and generally designated by reference numeral 10. The cage trap includes a trap body generally designated by reference numeral 12, having a base 14, a pair of opposed sidewalls 16 emanating from the base, a rear end generally designated by reference numeral 18 that includes a rear wall 20 secured to the sidewalls and the base, a roof 22 secured to the tops of the sidewalls and the rear wall, and a front end, generally designated by reference numeral 24, that is provided with an animal access opening covered by an entry door 26. The animal access opening is preferably defined by the base, sidewalls, and roof as shown in FIG. 1. For the purposes of description, "front" and "forward" as used herein are intended to correspond with the front end 24 of the trap while "rear" and "rearward" refer to the rear end 18 of the trap. At least the roof 22 and the entry door 26 are formed by a plurality of longitudinally extending wire bars 30 that intersect in generally right-angled relationship with a plurality of laterally extending wire bars 32 as shown in FIG. 1.

The entry door 26 is movably mounted at the front end 24 of the trap by a hinge mechanism generally designated by reference numeral 40. The entry door 26 operates in an opened position to reveal the animal access opening and in a closed position to block the animal access opening. The components of the trap which are operative to trap and contain an animal correspond with those found in the Havahart® Model 1079 trap which has been commercially available for many years.

Figure 2:
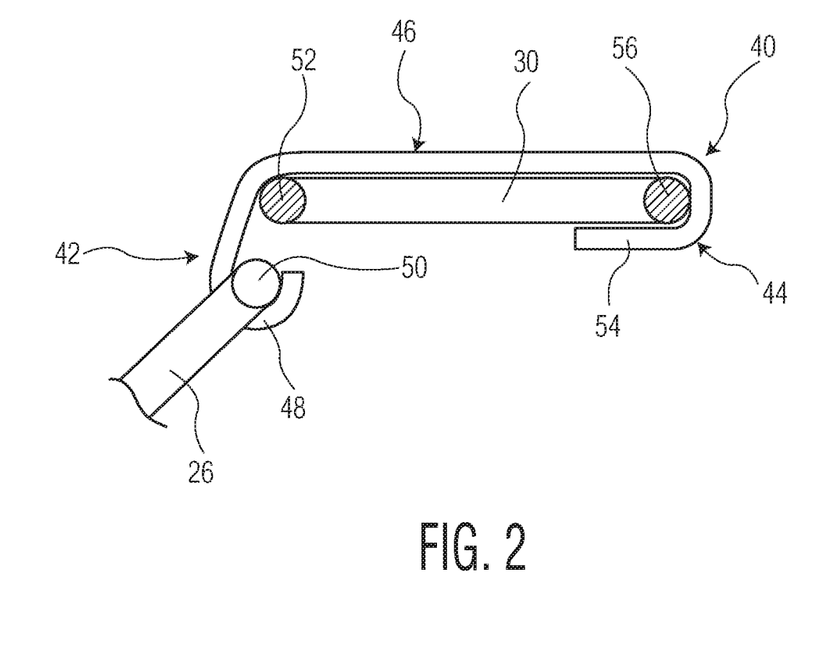
FIG. 2 is an enlarged partial cross sectional side view of the hinge mechanism when mounted to the trap as shown in FIG. 1.
Figure 3:
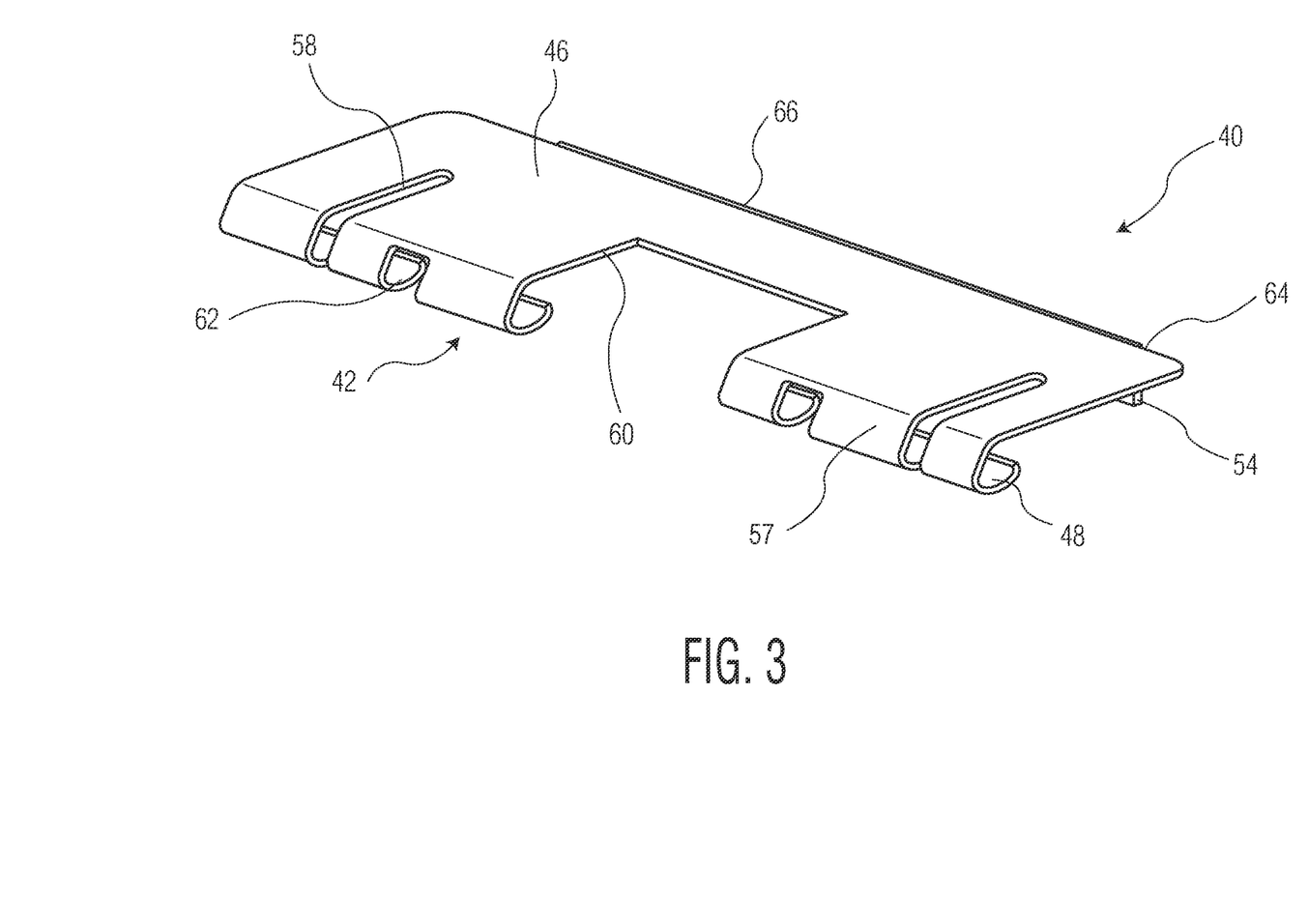
FIG. 3 is a front perspective view of the hinge mechanism prior to being mounted to a cage trap in accordance with the present invention.
Figure 4:
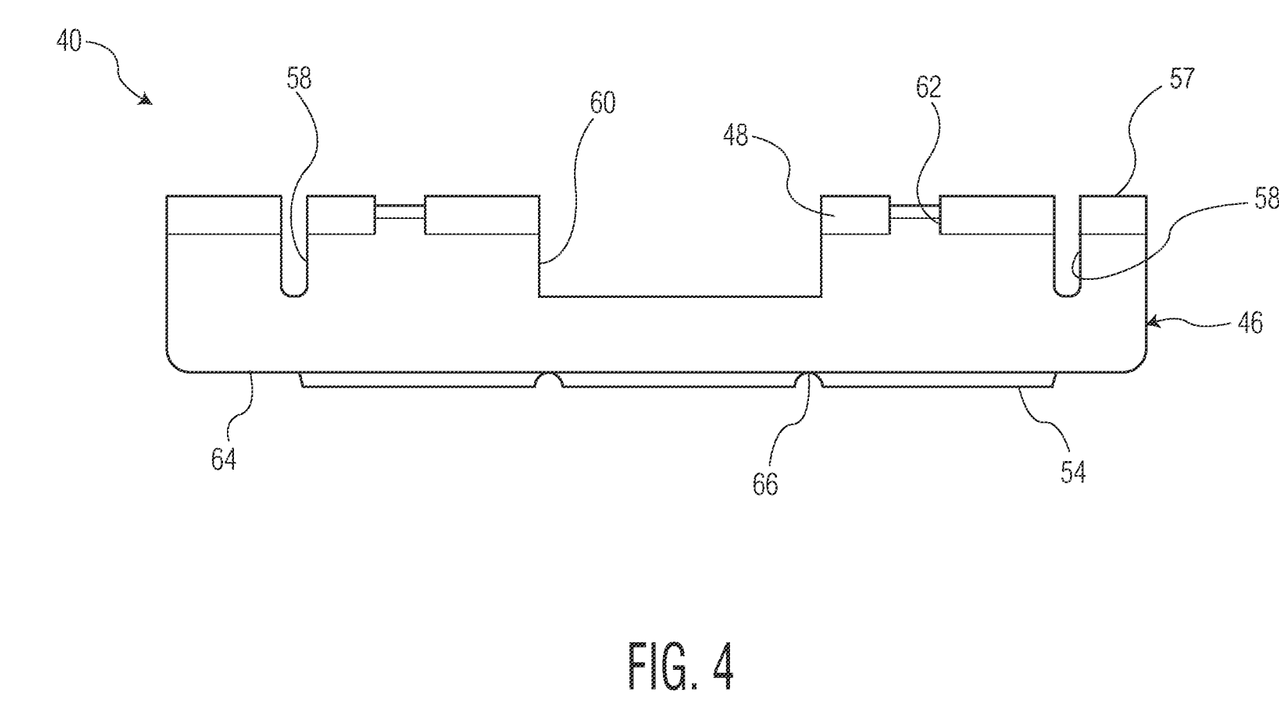
FIG. 4 is a bottom view of the hinge mechanism shown in FIG. 3.

FIG. 2 is a side partial cross-sectional view of the hinge mechanism 40 in the mounted configuration shown in FIG. 1. The hinge mechanism includes a door mounting portion generally designated by reference numeral 42, a roof mounting portion generally designated by reference numeral 44, and a substantially planar body portion generally designated by reference numeral 46 that joins the door mounting portion and the roof mounting portion. The door mounting portion 42 includes a J-hook 48 that captures a laterally extending wire bar 50 at the upper edge of the door 26 and works cooperatively with a laterally extending wire bar 52 on the roof 22 of the trap. The roof mounting portion 44 includes attachment tabs 54 that are bent forwardly to lap under the body portion 46 and capture a laterally extending wire bar 56 on the roof 22 when the hinge mechanism is secured to the trap as shown in FIG. 1. The body portion 46, which is preferably formed integrally with the mounting portions 42 and 44, such as by formed sheet metal, is substantially parallel with the roof 22 of the trap when the hinge mechanism 40 is mounted thereon.

Figure 7:
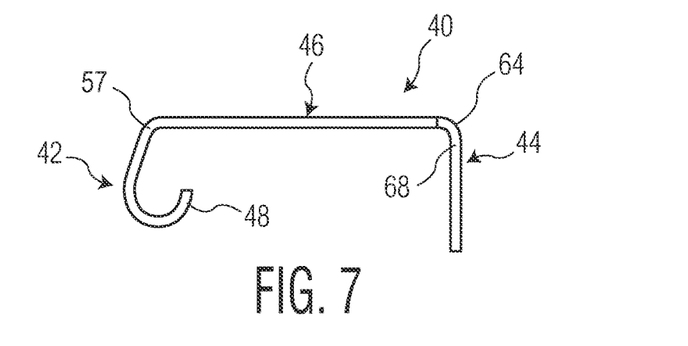
FIG. 7 is a side view of the hinge mechanism shown in FIG. 3.

FIGS. 3-9 show various views of the hinge mechanism 40 in a pre-mounted configuration. In the pre-mounted configuration, the attachment tabs 54 on the roof mounting portion 44 extend substantially perpendicular to the body portion 46 as best seen in FIG. 7.

Figure 10:
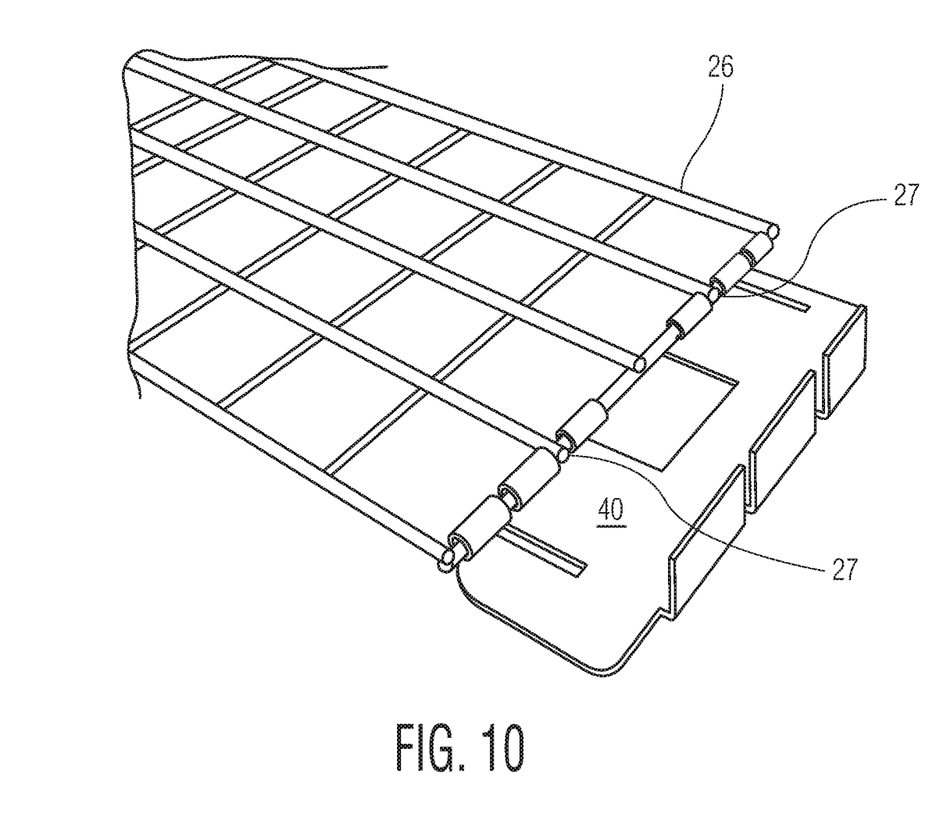
FIG. 10 is a perspective view of a hinge mechanism according to the present invention with the upper edge bar of the entry door within the J-hook of the hinge mechanism to create the axle for the hinge.

The front edge 57 of the door mounting portion 42 includes the J-hook 48 which creates the axle for the hinge mechanism when the upper edge laterally extending wire bar 50 of the door 26 is received in the J-hook as representatively shown in FIGS. 2 and 10. In this regard, it is noted that FIG. 10 is provided only to show the relationship of the upper bar 50 of the door within the J-hook and does not represent an assembly step taken apart from the trap body. Rather, during actual assembly of the hinge mechanism and door to the trap body, the relationship shown in FIG. 10 is formed only after the door is positioned inside the animal access opening with the upper edge bar 50 adjacent the underside of the roof while the hinge mechanism is brought into engagement with the roof of the trap from above the trap as will be described hereinafter in connection with FIGS. 11-13.

As mounted to the trap as shown in FIG. 2, the J-hook works cooperatively with the laterally extending wire bar 52 on the roof 22 of the trap to properly position the door while providing clearance to allow rotational movement of the upper edge door bar 50 relative to the roof bar 52 with reduced friction in the hinge joint as the door pivots between the open and closed positions. Also, by adjusting the size of the J-hook, virtually any wire gauge combination of the door and the trap body can be operatively positioned together to create an effective hinge mechanism.

The J-hook 48 and body portion 46 include longitudinally extending slots 58 and 60 at spaced intervals that correspond with the spacing of the longitudinally extending wire bars 52 on the roof 22 of the trap body. According to a preferred embodiment shown, the center slot 60 is wide enough to accommodate two spaced longitudinally extending roof bars (see FIGS. 11 and 12) while each of slots 58 is sized to fit one of the roof bars when the hinge mechanism is mounted. The center slot 60 could be formed as two spaced slots, however. The use of these slots during assembly of the hinge mechanism with the trap body will be discussed further hereafter in connection with the mounting steps shown in FIGS. 11-13.

The front edge 57 of the door mounting portion 42 also has cutouts 62. These cutouts are formed to accommodate the ends 27 (see FIG. 10) of the longitudinally extending wire bars on the door when the hinge mechanism is mounted.

Figure 5:
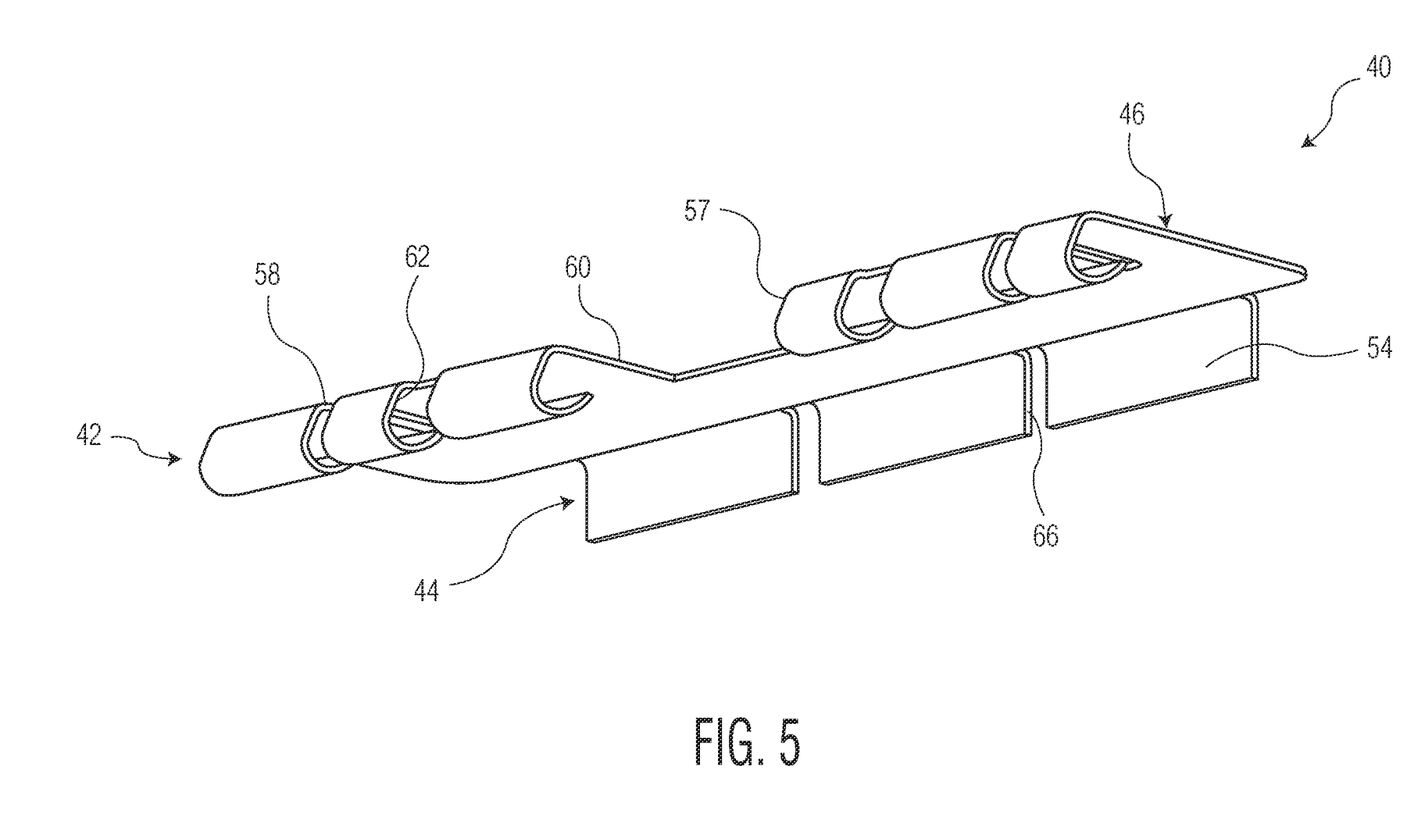
FIG. 5 is a lower perspective view of the hinge mechanism shown in FIG. 3.
Figure 6:
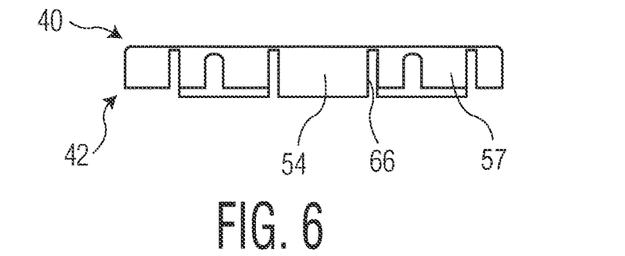
FIG. 6 is a front view of the hinge mechanism shown in FIG. 3.
Figure 8:
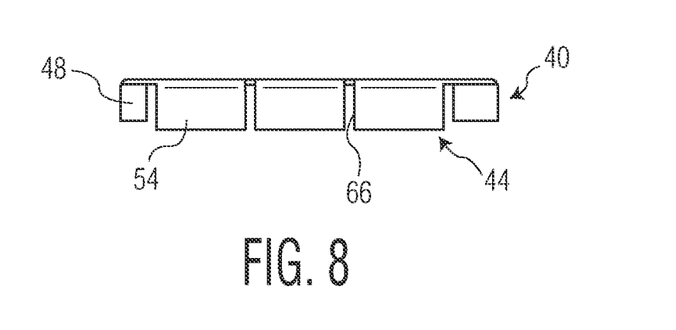
FIG. 8 is a rear view of the hinge mechanism shown in FIG. 3.
Figure 9:
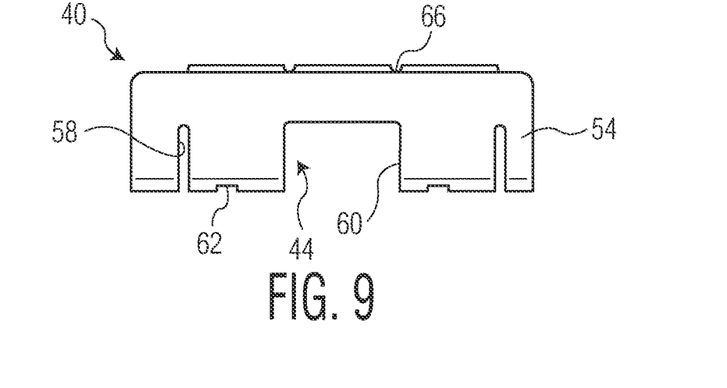
FIG. 9 is a top view of the hinge mechanism shown in FIG. 3.

The attachment tabs 54 formed on the rear edge 64 of the roof mounting portion 44 of the hinge mechanism are also spaced from one another by slots 66 as best seen in FIGS. 5 and 8. As already noted, prior to being mounted on the trap, the attachment tabs 54 extend substantially perpendicular to the body, creating an elbow joint 68 (see FIG. 7) up to which the slots 66 extend. Like the slots 58, 60 in the door mounting portion 42, the slots 66 in the roof mounting portion 44 are positioned at spaced intervals that correspond with the spacing of the longitudinally extending wire bars on the trap body. Thus, the longitudinally extending wire bars on the roof of the trap body are accommodated within the slots 66 when the hinge mechanism 40 is positioned on top of the roof 22 for mounting, while the attachment tabs 54 extend downwardly toward the base 14 of the trap body.

The body portion 46 of the hinge mechanism 40 is substantially planar and extends between the door mounting portion 42 and the roof mounting portion 44. According to the embodiment shown, the longitudinal length of the body portion extends between two adjacent laterally extending roof bars so that the J-hook curves around the forward bar 52 and the attachment tabs 54 are curled around the rearward bar 56 (see FIG. 2). In spanning between the two mounting portions 42, 44, the body portion 46 contributes to providing greater trap stiffness at the hinge and improved rigidity of the hinge mechanism and trap door.

Figure 11:
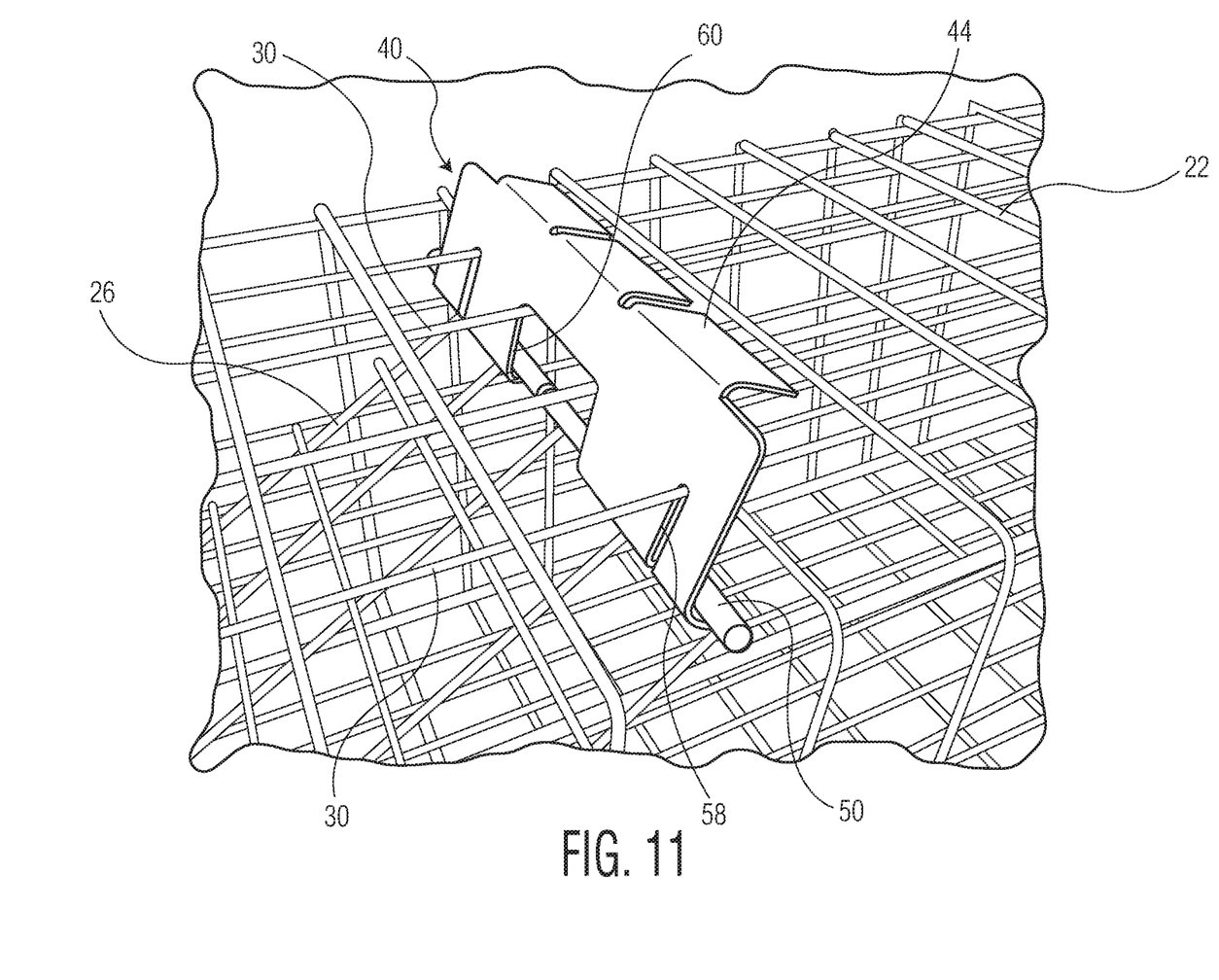
FIG. 11 is a perspective view showing the first assembly step by which the entry door shown in FIG. 10 is mounted to the cage trap, the longitudinally extending wire bars on the roof of the trap being received within the slots in the front edge of the J-hook.
Figure 12:
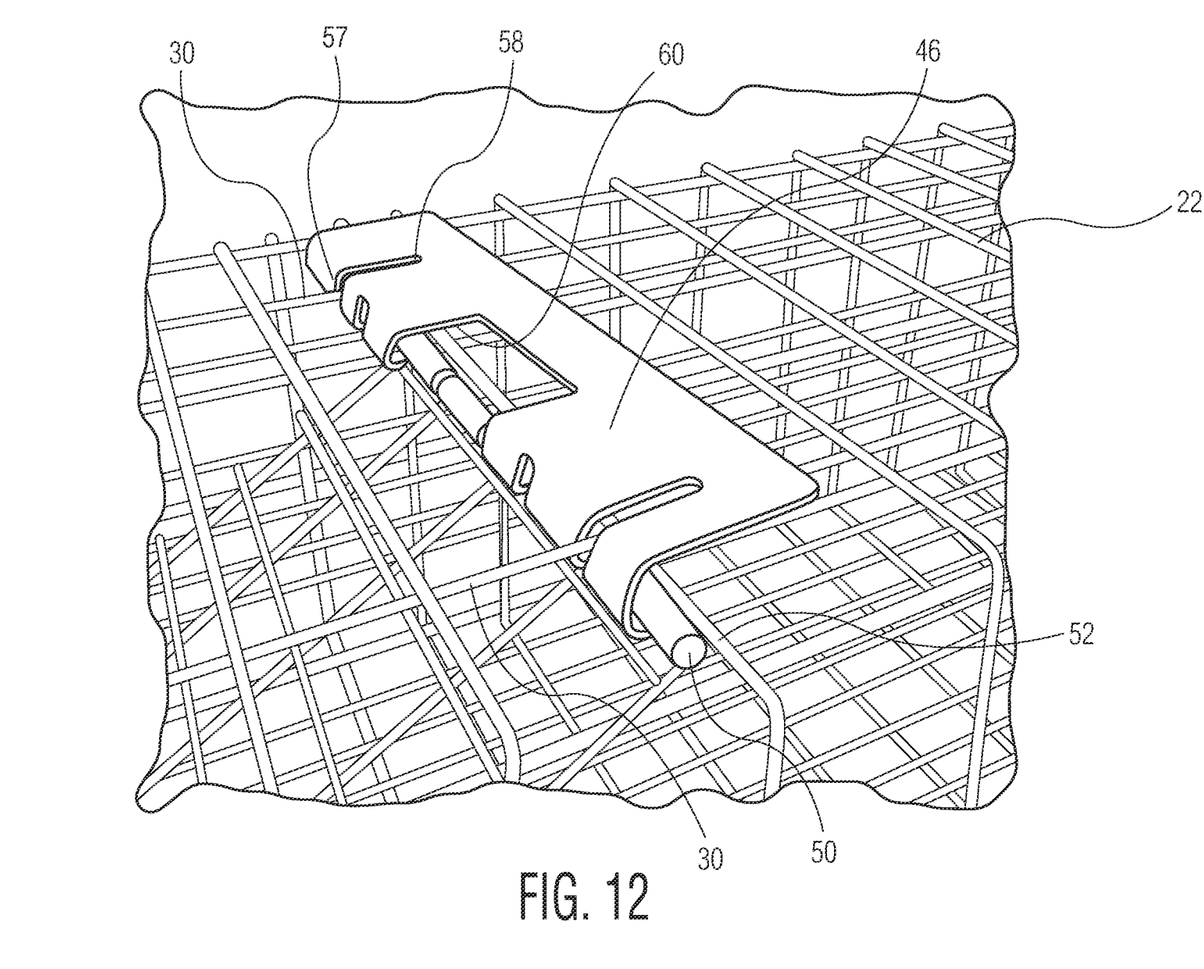
FIG. 12 is a perspective view following that of FIG. 11 in which a laterally extending wire bar on the roof of the trap has been placed within the J-hook adjacent the upper edge bar of the entry door, and the body of the hinge mechanism has been brought into generally parallel relationship on top of the trap roof with the attachment tabs (not visible in this view) extending downwardly toward the base of the trap.
Figure 13:
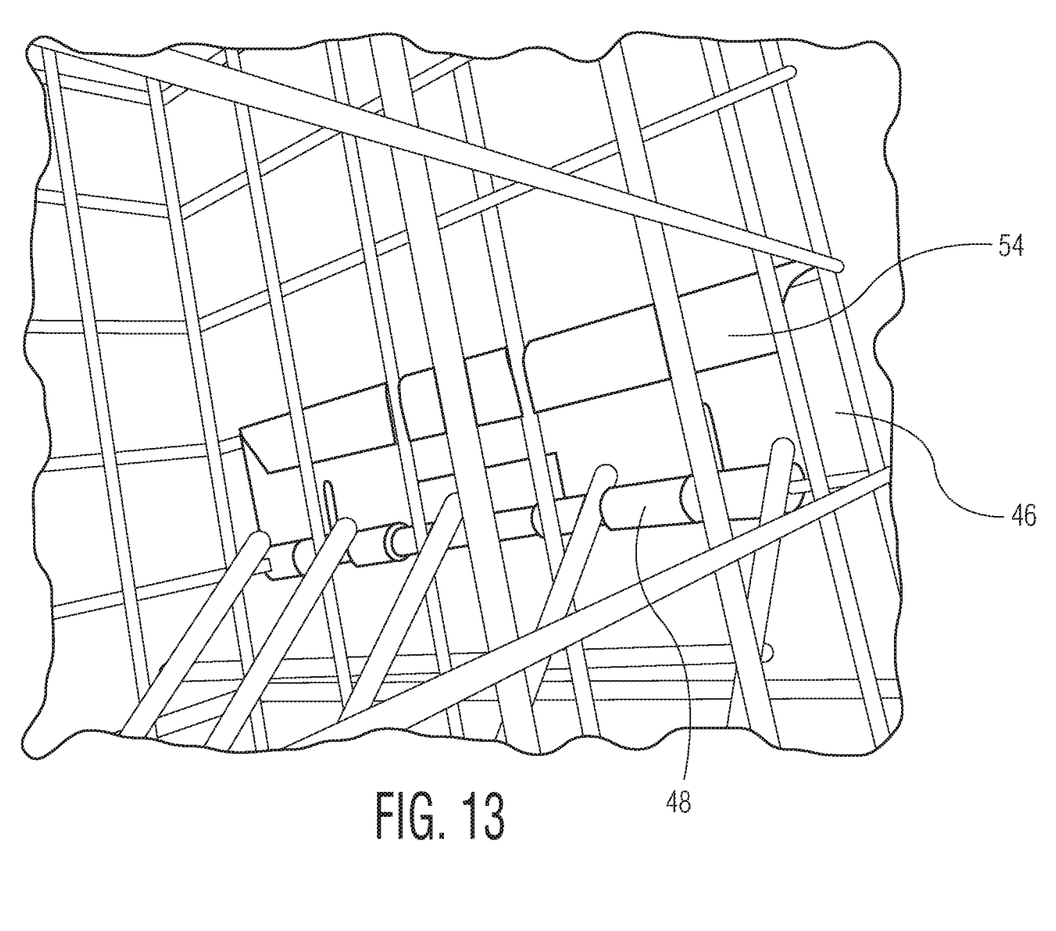
FIG. 13 is a perspective view from the underside of the hinge mechanism following that shown in FIG. 12 after the attachment tabs have been bent forwardly to lap under the body and around a laterally extending roof bar to secure the hinge mechanism to the roof of the trap.

FIGS. 11-13 are various perspective views showing the assembly steps for mounting the hinge mechanism 40 to secure the entry door 26 to the trap. First, the door 26 is positioned inside the trap with the upper edge 50 near the roof. The slots 58, 60 of the hinge mechanism 40 are aligned with corresponding longitudinally extending wire bars on the roof and the hinge mechanism is lowered, with the depth of the slots 58, 60 enabling the front edge of the hinge mechanism to be inserted into the trap interior so that the upper edge bar 50 of the door can be positioned inside the J-hook as shown in FIG. 11.

With the upper edge bar 50 of the door captured in the J-hook 48, the hinge mechanism 40 is lifted upwardly while keeping the roof mounting portion 44 elevated. As the hinge mechanism 40 comes up, the longitudinally extending bars 30 effectively "move down" the slots 58, 60 until the bars reach the front edge 57 of the door mounting portion 42 and the upper edge door bar is adjacent the laterally extending roof bar 52. The hinge mechanism is then rotated to lower the roof mounting portion 44, bringing the elbow joint adjacent and generally parallel with the laterally extending wire bar 56 of the roof so that the attachment tabs can extend downwardly toward the base of the trap as shown in FIG. 12.

The body portion 46 of the hinge mechanism 40 is then substantially parallel with the roof while the door edge bar 50 as captured within the J-hook is held in the desired proximal relationship with the laterally extending roof bar 52 to create the hinge axle.

As a final assembly step, the attachment tabs 54 are bent or curled forwardly along the elbow joint to lap under the body portion and capture laterally extending roof bar 56 as shown from a view taken inside the trap in FIG. 13. The hinge mechanism 40 is thereby secured to the roof of the trap. Once secured to the trap in this way, the hinge mechanism creates a more precise axial location of the hinge pivot at the door mounting portion for improved hinge action and more repeatable setting and tripping action. The hinge mechanism also provides greater trap stiffness at the hinge, improved rigidity of the hinge mechanism and trap door, and reduced friction in the hinge pivot.

The foregoing descriptions and drawings should be considered as illustrative only of the principles of the invention. The concepts disclosed herein may be modified to suit other specific trap designs as may be apparent to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. In a live catch animal trap having an animal enclosure defined by a trap body having an animal access opening leading into a vacant interior of the trap body sized to receive an animal to be trapped, and having an entry door movably mounted at the access opening, the entry door operative in an opened position to reveal the animal access opening and in a closed position to block the animal access opening, and a hinge mechanism that couples the entry door to a roof of the trap body, said hinge mechanism comprising:
    a door mounting portion that captures a laterally extending upper edge bar of said door and cooperates with a first laterally extending wire bar on the roof to couple the door to the trap body, the door mounting portion including a front edge configured as a J-hook with longitudinally extending slots formed therethrough at positions aligning with longitudinally extending wire bars on the entry door; and
    a roof mounting portion rigidly connected to and spaced rearwardly from the door mounting portion by a body portion, said roof mounting portion capturing a second laterally extending wire bar of the roof of the trap body when the hinge mechanism is mounted thereon for securing the hinge mechanism to the roof of the trap body.

2. The trap as set forth in claim 1, wherein the body portion is substantially planar and is formed integrally with the door mounting portion and the roof mounting portion, said body portion being substantially parallel with the roof of the trap body when the hinge mechanism is mounted thereon with the entry door coupled to the trap body by the door mounting portion.

3. The trap as set forth in claim 1, wherein the laterally extending upper edge bar of said entry door is received within the J-hook and the first laterally extending wire bar on the roof works cooperatively with the J-hook to mount the entry door to the trap in hinged relationship.

4. The trap as set forth in claim 1, wherein the roof mounting portion includes a plurality of attachment tabs formed at a rear edge of the body portion, said attachment tabs being separated from one another by slots formed through the roof mounting portion, a position of each of said slots corresponding with a position of one of longitudinally extending wire bars on the roof of the trap body.

5. The trap as set forth in claim 4, wherein the plurality of attachment tabs are substantially perpendicular to the body portion prior to mounting of the hinge mechanism, said plurality of attachment tabs being bent forwardly to capture the second laterally extending wire bar on the roof when the hinge mechanism is mounted thereon.

6. An animal trap comprising:
    an animal enclosure defined by a trap body having an animal access opening, the trap body including a roof with spaced longitudinally extending wire bars intersected by spaced laterally extending wire bars, the animal access opening being at one end of the trap body;
    an entry door pivotally mounted to the enclosure proximate the animal access opening and having at least one longitudinally extending wire bar intersected by at least one laterally extending wire bar; and
    a hinge element coupling the entry door to the roof of the trap body, including:
        a door mounting portion capturing the at least one laterally extending wire bar of the entry door on a first end thereof, including:
            a first slot defined therethrough and receiving the at least one longitudinally extending wire bar of the entry door; and
            a second slot defined therethrough and receiving one of the longitudinally extending wire bars of the roof of the trap body;
        a roof mounting portion capturing one of the laterally extending wire bars of the roof and including a third slot defined therethrough and receiving the one of the longitudinally extending wire bars of the roof of the trap body received within the second slot; and
        a body portion arranged between and rigidly connecting the door mounting portion to the roof mounting portion.

7. The trap as set forth in claim 6, wherein the hinge element is monolithic, and the door mounting portion, the roof mounting portion and the body portion of the hinge element are integrally formed from sheet metal.

8. A wire mesh live catch animal trap comprising:
    an animal enclosure defined by a trap body having an animal access opening leading into a vacant interior of the trap body sized to receive an animal to be trapped, the trap body including a roof with spaced longitudinally extending wire bars intersected by spaced laterally extending wire bars, the animal access opening being at one end of the trap body;
    an entry door pivotally mounted at the access opening, the entry door operative in an opened position to reveal the animal access opening and in a closed position to block the animal access opening, the entry door having spaced longitudinally extending wire bars intersected by spaced laterally extending wire bars, the spaced laterally extending wire bars on the entry door including an upper edge wire bar;
    a setting mechanism for placing the door in the opened position;
    a trip mechanism that when activated allows the door to move to the closed position; and
    a monolithic hinge mechanism that couples the entry door to the roof of the trap body, said hinge mechanism including a door mounting portion and a roof mounting portion rigidly connected to and spaced away from the door mounting portion, the roof mounting portion capturing one of the laterally extending wire bars of the roof of the trap body when the hinge mechanism is mounted thereon, the roof and door mounting portions are formed integrally with a body portion that extends between the door and roof mounting portions, the body portion is generally planar and is on top of and substantially parallel with the roof when the hinge mechanism is mounted to the trap body.

9. The trap as set forth in claim 8, wherein the door mounting portion includes a J-hook.

10. The trap as set forth in claim 9, wherein the upper edge wire bar on the entry door is received within the J-hook and one of the laterally extending wire bars on the roof works cooperatively with the J-hook to mount the entry door in hinged relationship.

11. The trap as set forth in claim 10, wherein the J-hook includes first longitudinally extending slots formed through the door mounting portion at positions aligning with the longitudinally extending wire bars on the entry door.

12. The trap as set forth in claim 11, wherein the J-hook further includes second longitudinally extending slots formed through the door mounting portion at positions aligning with the longitudinally extending wire bars of the roof.

13. The trap as set forth in claim 8, wherein the roof mounting portion includes a plurality of attachment tabs formed at a rear edge of the body portion.

14. The trap as set forth in claim 13, wherein the plurality of attachment tabs are substantially perpendicular to the body portion prior to mounting of the hinge mechanism, said plurality of attachment tabs being bent to capture the one of the laterally extending wire bars on the roof when the hinge mechanism is mounted thereon.

15. The trap as set forth in claim 14, wherein said attachment tabs are separated from one another by slots formed through the roof mounting portion, a position of each of said slots aligning with one of the longitudinally extending wire bars of the roof of the trap body.

16. The trap as set forth in claim 8, wherein the body portion is arranged on top of at least two adjacent laterally extending wire bars of the laterally extending wire bars of the roof when the hinge mechanism is mounted thereon.

* * * * *